United States Patent [19]

Schweitzer et al.

[11] Patent Number: 4,950,488

[45] Date of Patent: Aug. 21, 1990

[54] PROCESS OF USING PRECIPITATED AMORPHOUS SILICA OR SILICATE AS GRINDING AID FOR FISH MEAL OR FISH FOOD

[75] Inventors: Uwe Schweitzer, Karlstein, Fed. Rep. of Germany; Peter Hartwig, Ramsey, N.J.; Robert T. Herz, Jr., Norwalk, Conn.; Robert Steepy, Elmwood Park, N.J.

[73] Assignee: DeGussa AG, Frankfurt am Main, Fed. Rep. of Germany

[21] Appl. No.: 396,915

[22] Filed: Aug. 22, 1989

[51] Int. Cl.$^5$ .......................... A23K 1/10; A23L 1/326
[52] U.S. Cl. ....................... 426/1; 426/643; 426/805; 426/807
[58] Field of Search .............. 426/643, 652, 805, 807, 426/518, 1

[56] References Cited

U.S. PATENT DOCUMENTS

| | | | |
|---|---|---|---|
| Re. 31,763 | 12/1988 | Skoch et al. | 426/658 |
| Re. 31,804 | 1/1985 | Skoch et al. | 426/658 |
| 3,812,269 | 5/1974 | Mueller et al. | 426/807 X |
| 4,393,087 | 7/1983 | Sullins et al. | 426/74 |
| 4,582,708 | 4/1986 | Tipton et al. | 426/62 |
| 4,755,540 | 7/1988 | Blakey | 521/62 |

FOREIGN PATENT DOCUMENTS 47-21458 6/1972 Japan .................................. 426/805

OTHER PUBLICATIONS

Degussa Technical Bulletin Pigments, "Synthetic Silica for Pesticides", No. 1, May, 1980.
Degussa Technical Bulletin Pigments, "Synthetic Silica, a Modern Additive in the Animal Feed Industry", No. 30, Jul., 1979.
Degussa Technical Bulletin Pigments, "Aerosil for Improving the Flow Behaviour of Powder Substances", No. 31, Oct., 1984.
Degussa Technical Bulletin, "Precipitated Silicas and Silicates Manufacture, Properties and Application", Jul., 1984.

*Primary Examiner*—Arthur L. Corbin
*Attorney, Agent, or Firm*—Beveridge, DeGrandi & Weilacher

[57] ABSTRACT

A process for producing free flowing fish feed wherein precipitated amorphous silica or silicate or silica gel is added to fish feed and fish meal. The additive prevents clogging during grinding and tackiness in the fish feed.

12 Claims, No Drawings

PROCESS OF USING PRECIPITATED AMORPHOUS SILICA OR SILICATE AS GRINDING AID FOR FISH MEAL OR FISH FOOD

BACKGROUND OF THE INVENTION

The present invention relates to the use of precipitated amorphous silica or silicate as grinding aid for fish meal or fish food.

The consumption of fish has grown dramatically worldwide and especially in the United States and in Canada due to changes in the human diet during the last few years. As a result of the great demand for fish in the diet, hatcheries for different fish such as trout, herring, capelin, whitefish, catfish and particularly salmon have become more important.

It therefore becomes necessary to feed these fishes the most economical way. To accomplish this, it is standard practice to use the parts of fish which are not used for human consumption, such as bones, tails, heads, gill, etc., as part of the fish feed. The advantage of this practice is the high nutritional value of these parts as well as their low cost and abundance. These parts of the fish feed are called fish meal. Other parts of the final fish feed are, for example, corn cobs, grain, soy, minerals, vitamins and amino acids.

Another important area for fish meal is use as part of the diet for poultry.

The present invention provides fish meal or fish feed for consumption by fish and poultry. Fish feed normally is given to fish in the form of pellets, which are extruded. In order to extrude the fish feed, it is necessary to grind it into powder which can then be extruded. The usual grinding equipment is a hammer or disc mill. During this grinding process, as during all grinding processes, the temperature rises. This does not necessarily hamper a grinding process, but in the present case, the temperature increase is such that the fat content of the fish feed melts. As a result, the mill clogs, the operation has to be interrupted and the mill has to be cleaned.

Another problem which occurs is the increased tackiness of the milled product which tends to clog the sieves which are installed at the outlet side of the hammer mill. As a result, the opening of the sieves becomes smaller and the through-put of the mill is reduced.

A potential solution for this problem would be the use of a mill which can be cooled by a cooling liquid such as liquid nitrogen. These mills, however, are very expensive and the operation of these mills is uneconomical due to the cost of the cooling liquid.

The object of this invention was therefore, to find a cost efficient way to mill fish feed or fish meal without generating the problems of melting, clogging the apparatus, interrupting the process intermittently and to prevent the formation of tackiness in the product. I should be noted that the problems occur primarily with fish feed or fish meal which has a fat content of 5% or higher.

SUMMARY OF THE INVENTION

The present invention is directed to the use of a precipitated amorphous silica or silicate as a grinding aid for fish feed and fish meal.

The use of precipitated amorphous silica or silicate during grinding provides a free flowing storable product.

DETAILED DESCRIPTION OF THE INVENTION

Precipitated amorphous silica, unlike other forms of silica, has a high absorption capacity. Fumed silica which has certain absorption capacity is much more expensive and therefore uneconomical. Silica fume and all other forms of silica (e.g., natural occurring forms) contain crystalline content and therefore are legally not accepted for this application. The present invention makes it possible to enable a product having high content of moisture and fat to have the capacity to be free flowing during grinding.

This objective is obtained by the use of a precipitated amorphous silica or silicate as a grinding aid for fish feed and fish meal. This form of silica absorbs fat, oil and water which permits a high through-put of fish food during grinding without failure to maintain free flow.

It has been found that the use of fused silica fails to produce free flow of the product because it lacks high absorption of fat an moisture.

Precipitated amorphous silica and silica gel are accepted in the National Formulatory and Food Chemical Codes as food additive up to two percent of the final food or feed. It can therefore be used as part of the final fish feed. The material, which is manufactured by the reaction of sodium silicate with an acid, may have a surface area according to BET between 30 and 900 $m^2/g$, an oil absorption between 80 and 700 g/100g and pH between 3 and 10. The apparent particle size can be in the range from 1.5 micrometer to 150 micrometer, depending on the production process and whether the precipitated silica has been milled. The material is totally amorphous as per X-ray analysis and contains no crystalline parts which could be detected by this method.

Commercial products usually have a water content of approximately 3 to 7%, which may increase during storage.

There may be present small amounts of sodium sulfate or other salts as an impurity in the precipitated amorphous silica. The following examples serve to illustrate the invention. It is to be understood that the process and products are given by way of example only and not by way of limitation.

EXAMPLE 1

Herring meal containing six percent fat was fed into a laboratory Alpine Pin Mill at a rate of 280 g/min. The mill was run at 16000 rpm. After approximately 90 seconds, after about 400g of a 3000g batch had been fed, the mill was clogged and the operation had to be stopped since no more unground herring meal could be accepted by the mill. Also, the pins of the mill were full of the softened herring meal. This is an example of the problems currently occurring in the industry.

EXAMPLE 2

The same test as before was operated except that prior to introduction into the mill, the mix had been treated with 1% of a precipitated amorphous silica (SIPERNAT 50) with a surface area of approximately 450 $m^2/g$ and an apparent particle size of 50 micron. This precipitated amorphous silica was selected because of its high oil absorption of 350 g/100g as measured by a Brabender Plastograph. Fish meal and silica were mixed for two minutes in a horizontal ribbon blender.

This short mixing time had from previous experiments been proven to be sufficient.

A full batch of three kilogram of the so treated herring meal could be milled without problems at the same parameters as in Example 1. However, after finishing the grinding, some build up of material was observed at the walls of the mill. To simulate the sieves at the outlet of hammer mills, it was attempted to sieve the ground material through a hand sieve with an opening of 500 microns. This however was not possible, because the ground herring meal was too tacky and immediately clogged the sieve.

EXAMPLE 3

The same tests were repeated with 2% of the same precipitated silica as described above and exactly the same conditions at the blender and the mill. In this case, after completion of the trial, the mill was totally clean and the ground mix could easily be sieved through the sieve described in Example 2.

EXAMPLE 4

The same series of tests were repeated with capelin meal, white fish meal and a salmon feed mix. It led to essentially the same results as described in the previous examples. Although the salmon feed mix had a much higher fat content of 9% as compared to 6% for the other products, it would still very well be ground at 2% loading level of Sipernat 50.

EXAMPLE 5

To confirm that this invention is applicable for other mills, a trial was done in a hammer mill. Herring meal was again mixed with 2% SIPERNAT 50 in a ribbon blender for two minutes. The mixture was fed in the laboratory hammer mill at a rate of 300 g/min. The whole batch of 3000g could be milled without any problem. Especially, the sieve at the outlet of the mill was not clogged.

At this trial as in the other examples, it was noted that the mill is very clean after the trial with the use of treated fish meal, whereas trials with untreated fish meal led to material build-up in the mill. As a result the use of silica lowers the cleaning costs for th mill.

The material was stored in bags for two months and remain unchanged with respect to flowability.

The function of the precipitated amorphous silica in these trials is to absorb the fat which melts during the increase of the milling temperature. Therefore a material with higher oil absorption is the preferred material.

The same results were produced with amorphous silicates, for example with amorphous precipitated calcium silicate and with silica gels.

The application of the silica or silicate can be effected in different ways. The most cost effective way is to dust only the fish meal which has the high fat content and is therefore the primary source of fat or oil. Since the limitations of silica for feed stuff are limited to 2% of the total feed, the amount used for the fish meal can legally be considerably higher, since a fish feed contains only approximately 25 to 50% of fish meal. From the experiments a loading of 2% of the fish meal would be sufficient, which would relate to approximately 0.6% of the total feed.

As an alternative, the total feed mix may be dusted before it is being milled. This should only be done where a separate treatment of the fish meal is not possible. In this case, the overall use of silica is higher, since part of the mix that causes no problem to mill will be treated. Depending on the situation in the respective plant, this process may, however, be more economical.

It is clear that the amount of silica or silicate required for best results depends upon the quality and fat content of the fish meal, the type of mill that is used, the milling rate, the concentration of fish meal in the fish feed, and the temperature.

We claim:

1. A process for preparation, of free-flowing fish food comprising the steps of: admixing a grinding aid additive selected from the group consisting of precipitated amorphous silica, precipitated amorphous silicate or amorphous silica gel with a feed selected from the group consisting of fish food and fish meal, and grinding the resulting admixture.

2. A process according to claim 1, wherein the BET surface area of the silica is between 30 and 900 $m^2/g$.

3. The process according to claim 1, wherein the particle size of the silica range from 1.5 to 150 micrometers.

4. The process according to claim 1, wherein the silica has an oil absorption between 80 and 700g/100g.

5. The process according to claim 1, wherein the silica is present in an amount of about 2% of the admixture 6. The process of claim 1, wherein the fish meal is herring meal.

7. The process of claim 1, wherein the fish meal is capelin meal.

8. The process of claim 1, wherein the fish meal is white fish meal.

9. The process of claim 1, wherein the feed is a fish food premix.

10. The process of claim 1, wherein the additive is precipitated amorphous silicate.

11. The process of claim 10, wherein the silicate is precipitated amorphous calcium silicate.

12. The process of claim 1, wherein the additive is amorphous silica gel.

* * * * *